(12) United States Patent
Shimanuki et al.

(10) Patent No.: US 6,545,609 B2
(45) Date of Patent: Apr. 8, 2003

(54) HUMIDIFICATION SYSTEM FOR FUEL CELL

(75) Inventors: Hiroshi Shimanuki, Wako (JP); Yoshio Kusano, Wako (JP); Motohiro Suzuki, Wako (JP); Toshikatsu Katagiri, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/771,723

(22) Filed: Jan. 29, 2001

(65) Prior Publication Data

US 2001/0010496 A1 Aug. 2, 2001

(30) Foreign Application Priority Data

Jan. 31, 2000 (JP) ........................................ 2000-023221

(51) Int. Cl.[7] ............................................... G08B 21/00
(52) U.S. Cl. ........................ 340/607; 340/438; 210/638; 210/650
(58) Field of Search ................................ 340/607, 438; 210/634, 638, 640, 650

(56) References Cited

U.S. PATENT DOCUMENTS 5,477,731 A * 12/1995 Mouton ........................... 73/38
5,595,138 A * 1/1997 Claret ........................... 116/268

FOREIGN PATENT DOCUMENTS

| JP | 6-132038 | 5/1994 |
| JP | 8-273687 | 10/1996 |

* cited by examiner

Primary Examiner—Julie Lieu
(74) Attorney, Agent, or Firm—Lahive & Cockfield, LLP

(57) ABSTRACT

A humidification system for a fuel cell includes a humidifier having a bundled plurality of tube type hollow thread members made of a water permeable membrane. The humidifier transfers a water content contained in a discharge gas, which is emitted from a fuel cell, to a supply gas, which is supplied to the fuel cell, when one of the discharge gas and the supply gas is passed through the inside of the tube type hollow thread members and the other one of the discharge gas and the supply gas is passed through between the tube type hollow thread members. Manometers P1, P2, P3, and P4 detect a difference in pressure of the supply gas and the discharge gas, respectively, between an upper stream side and a down stream side of the humidifier. A determination unit determines a generation of clogging in the humidifier based on detection signals from the manometers.

8 Claims, 8 Drawing Sheets

HUMIDIFICATION SYSTEM FOR FUEL CELL

BACKGROUND OF THE INVENTION

1. Field of the Invention

The present invention relates to a humidification system for a fuel cell. More specifically, the present invention relates to a humidification system provided with a fuel cell which has been adapted as an energy source for a vehicle, such as an electric vehicle.

2. Description of Related Art

Recently, a vehicle, such as an electric vehicle, which utilizes a "clean energy", such as a solid polymer type fuel cell, has been developed. The Japanese Unexamined Patent Application, First Publication No. 6-132038, for instance, discloses a solid polymer electrolyte type fuel cell which may be used for such an energy source.

In general, a solid polymer type fuel cell that is used for such vehicles has a laminate structure in which a power generating element is supported by gas separating members from both sides thereof. In the laminate structure, a plurality of gas passageways for supplying a reaction gas is formed on a power generating element which is formed by a hydrogen ion conductive solid polymer being sandwiched by a pair of carbon electrodes carrying platinum catalyst (i.e., a solid polymer electrolyte membrane—electrode joined unit) and each electrode surface.

When the above-mentioned solid polymer type fuel cell is used, hydrogen gas is supplied to one of the electrodes as a fuel supply gas and oxygen or air is supplied to the other electrode as a supply gas for an oxidizing agent. In such a manner, electricity is extracted directly from chemical energy obtained by an oxidation reduction reaction of the fuel supply gas.

That is, the electric energy is taken out of the series of electrochemical reactions in which the hydrogen gas is ionized at the anode side to move in the solid polymer electrolyte and the electrons are moved toward the cathode side via an external load to react with the oxygen to produce water.

In the above-mentioned fuel cell, if the solid polymer electrolyte membrane is dried out, the efficiency in the ion conductivity thereof is decreased. Accordingly, the efficiency in the energy conversion is also decreased. Therefore, it is necessary to supply water to the solid polymer electrolyte membrane so that an excellent ion conductivity thereof may be maintained.

For this reason, a humidification device is provided with a fuel cell of the above type, which is capable of humidifying supply gas, such as a fuel supply gas and a supply gas for an oxidizing agent, and supplying water to the solid polymer electrolyte membrane so that an excellent reaction of at the membrane may be maintained.

The structure of an example of the humidification device will be explained with reference to FIG. 10. In FIG. 10, a humidification device is indicated by a numeral 1. In the humidification device 1, outside air which is pressurized by a super charger 2 is supplied to a supply gas line 5 as a supply gas for an oxidizing agent and the supply gas is humidified by the humidification device 1. The humidified air is then supplied to a fuel cell (hereinafter referred to as a stack) 3 and the oxygen contained in the humidified air is used as an oxidizing agent. After that, the gas is emitted as a discharge gas.

Also, the discharge gas containing water which is generated when reacted in the stack 3 is supplied to the humidification device 1, via a discharge gas line 6, from the stack 3. The water vapor contained in the discharge gas is transferred to the supply gas in the humidification device 1 and then evacuated.

As shown in FIG. 4, a pressure regulating valve 4 which regulates the inner pressure of the stack 3 is provided with the discharge gas line 6.

A humidifier 11 as shown in FIGS. 11 and 12 is disposed in the humidification device 1.

The humidifier 11 is formed by a plurality of tube type porous hollow thread members 12 which are made of a vapor permeable membrane (i.e., a water permeable membrane). The plurality of tube type porous hollow thread members 12 are contained in a cylidrically shaped casing 14 which has a plurality of opening portions 13 formed around its peripheral surface in the proximity to both ends thereof. The outer surfaces of the hollow thread members 12 as well as the outer surface of the hollow thread member 12 and the inner surface of the casing 14 are sealed at both ends of the casing 14.

In the humidifier 11, the supply gas is supplied from the opening portions 13 located in the proximity to one of the two ends of the casing 14. The supply gas is passed through the gap present between each of the hollow thread members 12 and exited from the opening portions 13 located in the proximity to the other end of the casing 14. Also, the discharge gas supplied from the stack 3 is supplied to the hollow thread members 12 from one end of the casing and exited from the other end.

As shown in FIG. 13, the hollow thread member 12 has numerous capillary portions 15 and the vapor contained in the discharge gas, which is introduced to the hollow thread members 12, is condensed in the capillary portions 15 and moved toward an outer periphery side thereof. The condensed vapor is then evaporated into the supply gas.

That is, the water content of the discharge gas is transferred to the supply gas in the humidifier 11 so that the humidification of the supplied gas is performed.

However, since extremely thin threads having an inner diameter of, for instance, about 0.3 mm (cf. the capillary portion size is about 4 nm) are used as the hollow thread members 12 in the humidifier 11, there is a danger that the capillaries of the hollow thread members 12 may be blocked by dust contained in the discharge gas which is supplied from the stack 3. Also, since the hollow thread members 12 used in the humidifier 11 are bundled and the supply gas is passed through between each of the hollow thread members 12, there is a danger that the gap between each of the hollow thread members 12 may also be blocked by dust which may be contained in the supply gas.

If the capillaries of the hollow thread members 12 or the gap between each of the hollow thread members 12 is blocked, a transfer of the vapor contained in the discharge gas to the supply gas cannot be satisfactorily carried out and, hence, a sufficient amount of water cannot be supplied to the stack 3. Thus, the efficiency in power generation of the stack 3 is decreased and this may lead to a cause of the failure of the stack 3.

SUMMARY OF THE INVENTION

Accordingly, one of the objectives of the present invention is to provide a humidification system for a fuel cell which does not have the above-mentioned problems.

Another objective of the present invention is to provide a humidification system for a fuel cell which is capable of quickly detecting a clogging in a humidifier so that the affect to a stack caused by the decrease in humidification of a supply gas due to the clogging in the humidifier may be suppressed to a minimal level.

The above objectives may be achieved by a humidification system for a fuel cell according to the present invention, including: a humidifier having a bundled plurality of tube type hollow thread members made of a water-permeable membrane, the humidifier transferring a water content contained in a discharge gas, which is emitted from a fuel cell, to a supply gas, which is supplied to the fuel cell, when one of the discharge gas and the supply gas is passed through the inside of the tube type hollow thread members and the other one of the discharge gas and the supply gas is passed through between the tube type hollow thread members; and a detection device which detects a generation of clogging in or between the tube type hollow thread members.

According to the above humidification system, since the detection device which is capable of detecting clogging is provided with the humidifier which humidifies the supply gas by transferring water vapor contained in the discharge gas to the supply gas by means of the water-permeable membrane that forms the bundled plurality of hollow thread members, it becomes possible to minimize the occurrence of problems, such as a decrease in the power generation efficiency of the fuel cell due to an insufficient degree of humidification of supply gas caused by the clogging in the humidifier, and avoid a failure of the fuel cell.

The above objectives may also be achieved by a humidification system for a fuel cell, wherein the detection device includes: a manometer which detects a difference in pressure of at least one of the supply gas and the discharge gas between an upper stream side and a down stream side of the humidifier; and a determination unit which determines a generation of clogging in the humidifier based on a detection signal from the manometer.

According to the above humidification system, the determination unit measures the difference in pressure of at least one of the supply gas and the discharge gas between an upper stream side and a down stream side of the humidifier based on the detection signal from the manometers and, based on the result, the generation of clogging in or between the hollow thread members in the humidifier may be easily detected. Accordingly, problems in the humidification system, such as a failure of the fuel cell, may be prevented.

The above objectives may also be achieved by a humidification system for a fuel cell, wherein the detection device includes: a dew point recorder which detects a dew point of at least one of the supply gas, which is supplied to the fuel cell, and the discharge gas, which is emitted from the fuel cell and introduced to the humidifier; and a determination unit which determines a generation of clogging in the humidifier based on a detection signal from the dew point recorder.

According to the above humidification system, the determination unit measures the dew point of at least one of the supply gas, which is introduced to the fuel cell from the humidifier, and the discharge gas, which is emitted to the humidifier from the fuel cell, based on the detection signal from the dew point recorder and, based on the result, the generation of clogging in or between the hollow thread members in the humidifier may be easily detected. Accordingly, problems in the humidification system, such as a failure of the fuel cell, may be prevented.

The above objectives may also be achieved by a humidification system for a fuel cell, wherein the detection device includes: a voltmeter which detects a voltage of the fuel cell; and a determination unit which determines a generation of clogging in the humidifier based on a detection signal from the voltmeter.

According to the above humidification system, the determination unit easily measures the output state of the fuel cell based on the detection signal from the voltmeter and, based on the result, the generation of clogging in or between the hollow thread members in the humidifier may be detected. Accordingly, problems in the humidification system, such as a failure of the fuel cell, may be prevented.

The above objectives may also be achieved by a humidification system for a fuel cell, wherein the determination unit determines if clogging is generated in or between the tube type hollow thread members by comparing the detection signal with a predetermined threshold value.

According to the above humidification system, the determination unit easily determines if clogging is generated in or between the hollow thread members by comparing the detection signal with the predetermined threshold value. Accordingly, an adverse effect to the fuel cell due to the clogging may be prevented.

BRIEF DESCRIPTION OF THE DRAWINGS

Some of the features and advantages of the invention have been described, and others will become apparent from the detailed description which follows and from the accompanying drawings, in which.

DETAILED DESCRIPTION OF THE INVENTION

The invention summarized above and defined by the enumerated claims may be better understood by referring to the following detailed description, which should be read with reference to the accompanying drawings. This detailed description of a particular preferred embodiment, set out below to enable one to build and use one particular implementation of the invention, is not intended to limit the enumerated claims, but to serve as a particular example thereof. Note that in the following drawings, the same numerals are used for explaining the same structure shown in the above-described prior art and the explanation thereof will be omitted.

Figure 1:
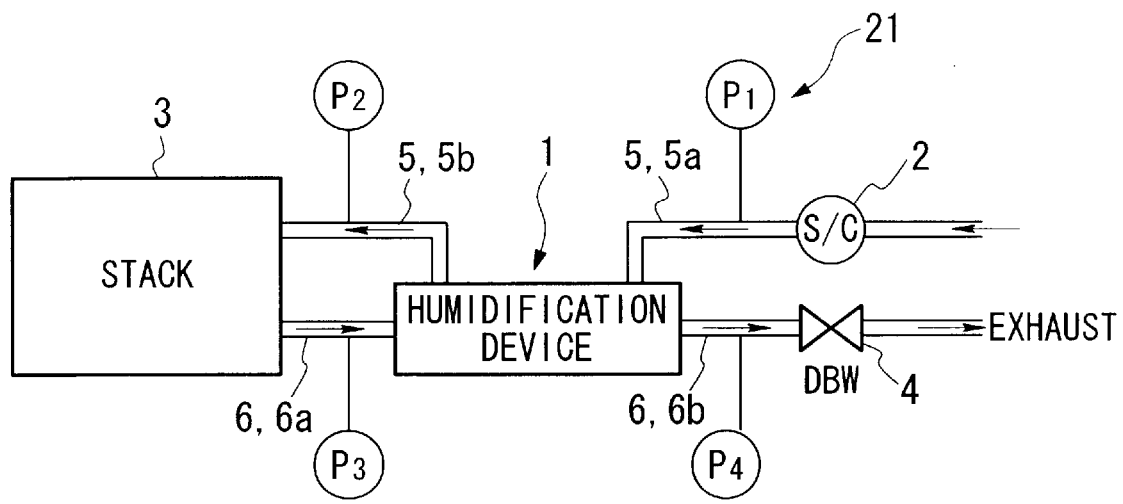
FIG. 1 is a schematic diagram showing a simplified arrangement of a fuel cell for explaining a configuration and a structure of a humidification system for a fuel cell according to a first embodiment of the present invention.

A humidification system 21 according to an embodiment of the present invention is shown in FIG. 1. In the humidification system 21 shown in FIG. 1, a supply gas line 5a is located at an upper stream side for supplying a supply gas to a humidifier 11 of a humidification device 1 and a supply gas line 5b is located at a down stream side for introducing the supply gas, which is emitted from the humidifier 11, to a stack 3. Manometers P1 and P2 are provided with the supply gas lines 5a and 5b, respectively, so that the pressure inside each of the supply gas lines 5a and 5b is measured by the manometers P1 and P2, respectively.

Also, a discharge gas line 6a is located at an upper stream side for supplying a discharge gas from the stack 3 to the humidifier 11 of the humidification device 1 and a discharge gas line 6b is located at a down stream side for emitting the discharge gas which is emitted from the humidifier 11. Manometers P3 and P4 are provided with the discharge gas lines 6a and 6b, respectively, so that the pressure inside each of the discharge gas lines 6a and 6b is measured by the manometers P3 and P4, respectively.

Next, the control system of the humidification system 21 will be explained with reference to FIG. 2.

Figure 2:
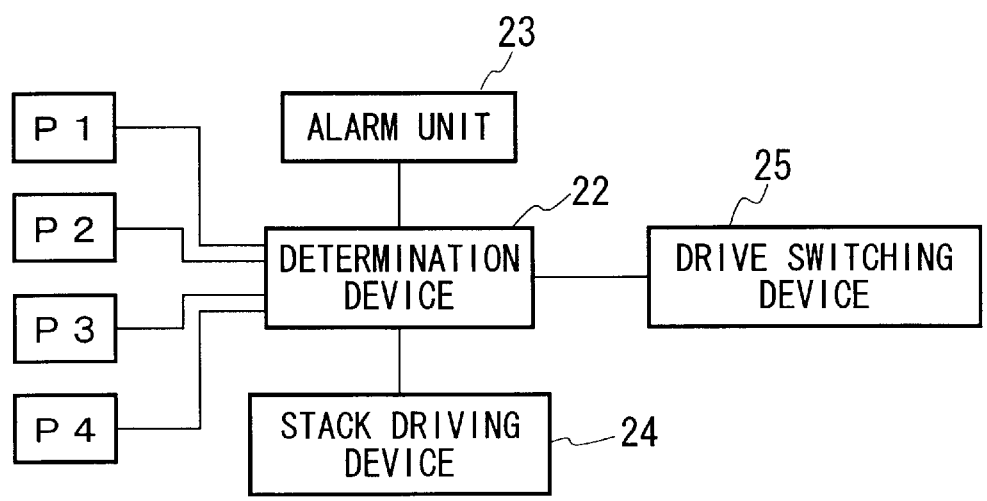
FIG. 2 is a block diagram for explaining a function of the humidification system for a fuel cell according to the first embodiment of the present invention.

As shown in FIG. 2, the manometers P1, P2, P3, and P4 provided with the supply gas lines 5a and 5b, and the discharge gas lines 6a and 6b, respectively, are connected to a determination unit 22 and detection signals of the manometers P1, P2, P3, and P4 are output to the determination unit 22. The determination unit 22 may be, for instance, a computer program that can be run by a computer hardware.

Also, as shown in FIG. 2, an alarm unit 23 which generates an alarm, a driving device 24 which drives the stack 3, and a drive switching device 25 which switches the driving source from the stack 3 to another driving source, such as batteries, are connected to the determination unit 22.

Figure 3:
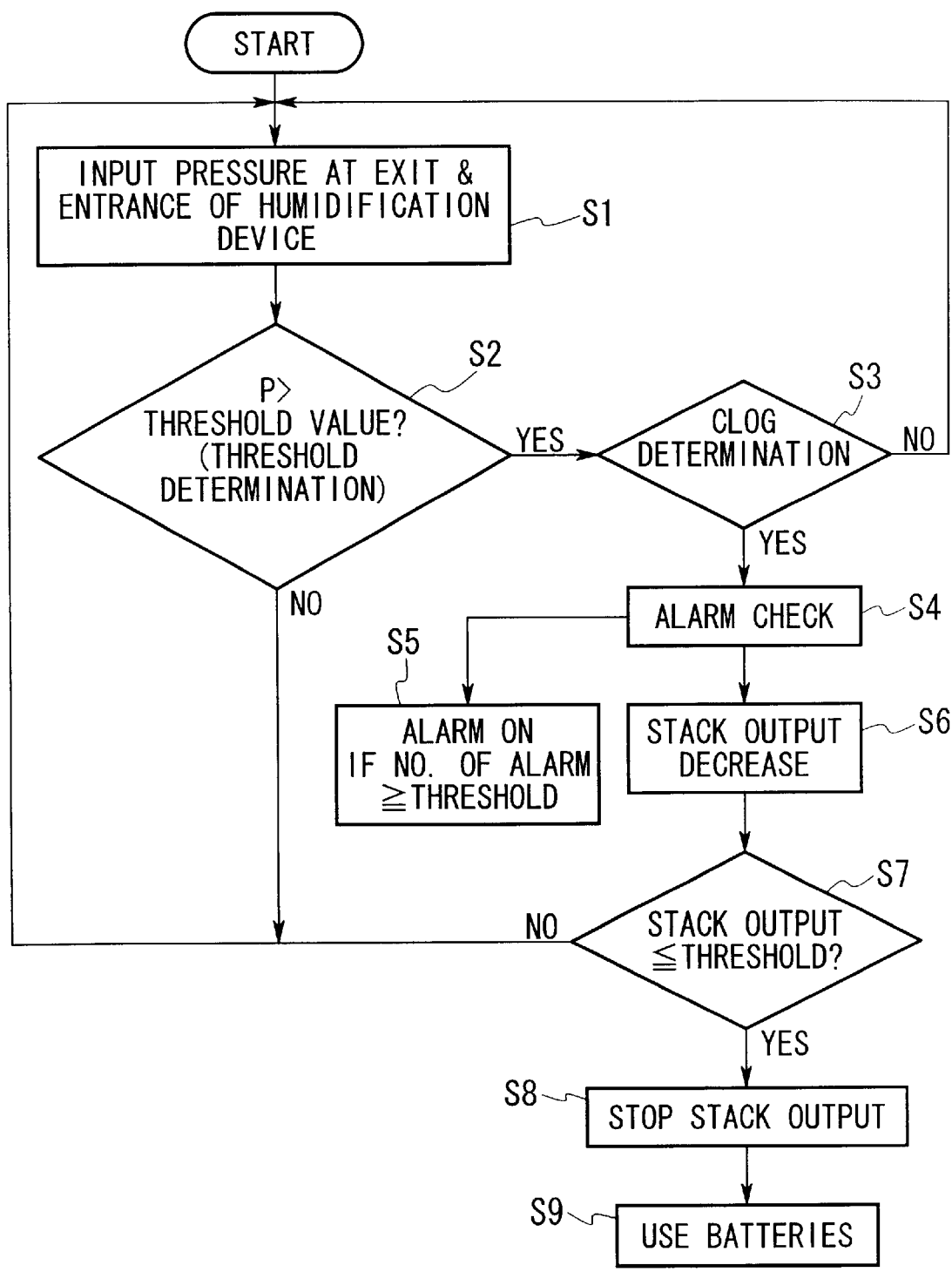
FIG. 3 is a flow chart for explaining a determination control of clogging carried out by the humidification system for a fuel cell according to the first embodiment of the present invention.

Next, a process for determining a generation of clogging which is carried out by the determination unit 22 of the humidifier 11 in the humidification device 1 will be explained with reference to a flow chart shown in FIG. 3.

When the stack 3 is actuated and a supply of the supply gas is started, the supply gas is first humidified, in the humidification device 1, by water components contained in the discharge gas emitted from the stack 3. The humidified supply gas is then supplied to the stack 3.

At this time, detection signals from the manometers P1, P2, P3, and P4 provided with the supply gas lines 5a and 5b and the discharge gas lines 6a and 6b, respectively, which are connected to the humidification device 1, are sent to the determination unit 22 (in step S1).

When the detection signals of the manometers P1, P2, P3, and P4 are sent to the determination unit 22, the determination unit 22 measures the difference in pressure between the supply gas lines 5a and 5b based on the detection signals from the manometers P1 and P2, and the difference between the discharge gas lines 6a and 6b based on the manometers P3 and P4. The determination unit 22 then determines if these differences are larger than the respective predetermined threshold value (in step S2).

If the difference in pressure between the supply gas lines 5a and 5b or between the discharge gas lines 6a and 6b is larger than the predetermined threshold value, the determination unit 22 determines if clogging is caused in the humidification device 1 (in step S3).

If it is determined that the clogging is caused in the humidification device 1 by the determination unit 22, the determination unit 22 carries out an alarm check (in step S4) and, if the number of alarm exceeds a predetermined threshold value, the determination unit 22 outputs a signal to the alarm unit 23 so that an alarm lamp is lit by the alarm unit 23 to notify the generation of clogging in the humidification device 1 (in step S5). In stead of lighting the alarm lamp, the alarm unit 23 may produce an alarm sound.

Also, the determination unit 22 decreases the output of the stack 3 which is driven by the stack driving device 24 (in step S6).

After that, the determination unit 22 determines if the decreased output of the stack 3 is less than a predetermined threshold value (in step S7). If the output is equal to or less than the predetermined threshold value, the determination unit 22 stops the operation of the stack 3 by the stack driving device 24 to terminate the generation of the output by the stack 3 (in step S8) and outputs a control signal to the drive switching device 25 to switch the driving output from the stack 3 to batteries so that the vehicle may be driven by the electric power generated by the batteries (in step S9).

As mentioned above, according to the humidification system 21, the determination unit 22 determines the difference in pressure of the supply gas and that of the discharge gas, respectively, between the upper stream side and the down stream side of the humidifier 11 of the humidification system 1 based on the detection signal from the manometers P1, P2, P3 and P4. Then, based on the results in the above procedure, the generation of clogging in the hollow thread members 12 or between the hollow thread members 12 may be determined very easily.

In this manner, problems such as the decrease in power generation efficiency of the stack 3 due to insufficient humidification caused by clogging in or between the hollow thread members 12 may be detected at an early stage thereof to minimize the damage which may be given to the system. Also, the failure of the stack 3 which can be caused by such a damage may be prevented.

In the embodiment explained above, although the pressure of both the supply gas and the discharge gas at the upper stream side and the down stream side is detected, it is possible to measure the pressure of only one of the gasses and carry out a determination process for generation of clogging based on the difference in pressure of that gas.

Next, a second embodiment according to the present invention will be explained.

Figure 4:
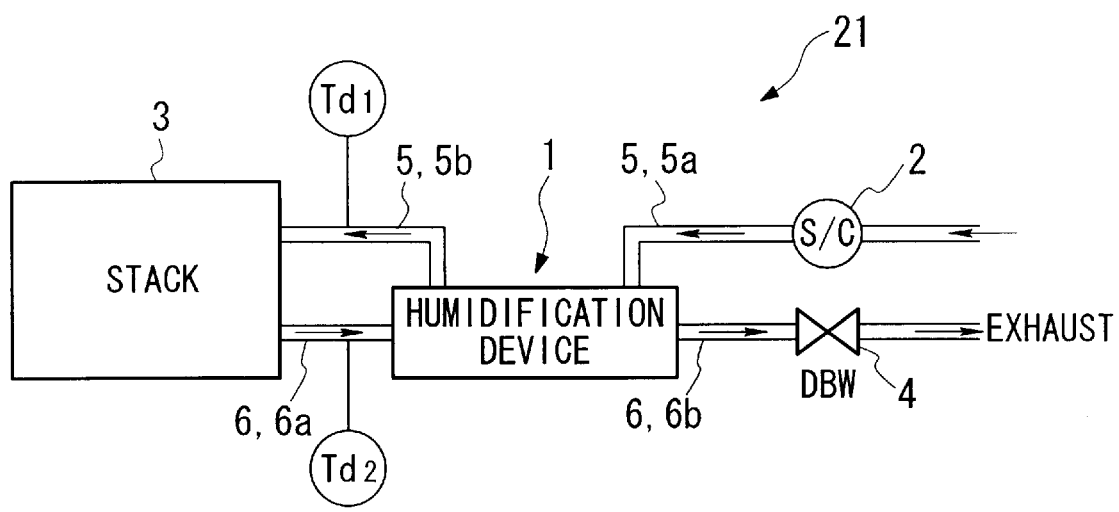
FIG. 4 is a schematic diagram showing a simplified arrangement of a fuel cell for explaining a configuration and a structure of a humidification system for a fuel cell according to a second embodiment of the present invention.
Figure 5:
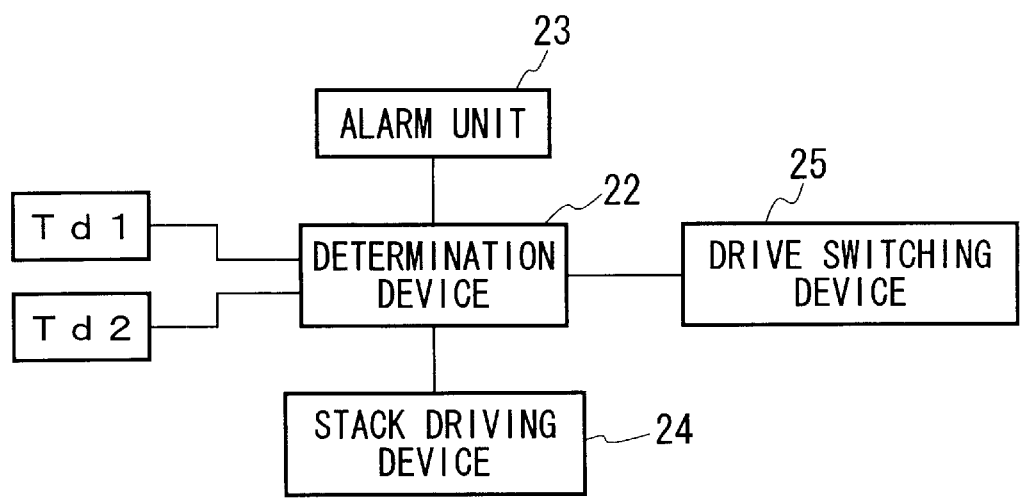
FIG. 5 is a block diagram for explaining a function of the humidification system for a fuel cell according to the second embodiment of the present invention.

As shown in FIG. 4, dew point recorders Td 1 and Td 2 are provided with the supply gas line 5a and the discharge gas line 6a, respectively, of the humidification system 21. These dew point recorders Td 1 and Td 2 detect the dew point of the gas in the supply gas line 5b and discharge gas line 6a, respectively. As shown in FIG. 5, detection signals from the dew point recorders Td 1 and Td 2 are output to the determination unit 22.

In the humidification device 1, if the clogging in or between the hollow thread members 12 is caused in the humidifier 11, the dew point of the supply gas and that of the discharge gas is decreased because the humidification capacity thereof for the supply gas is decreased.

That is, in the humidification system 21, the decrease in the dew point of the gas in association with the decrease in the humidification performance of the humidifier 1 is detected.

Figure 6:
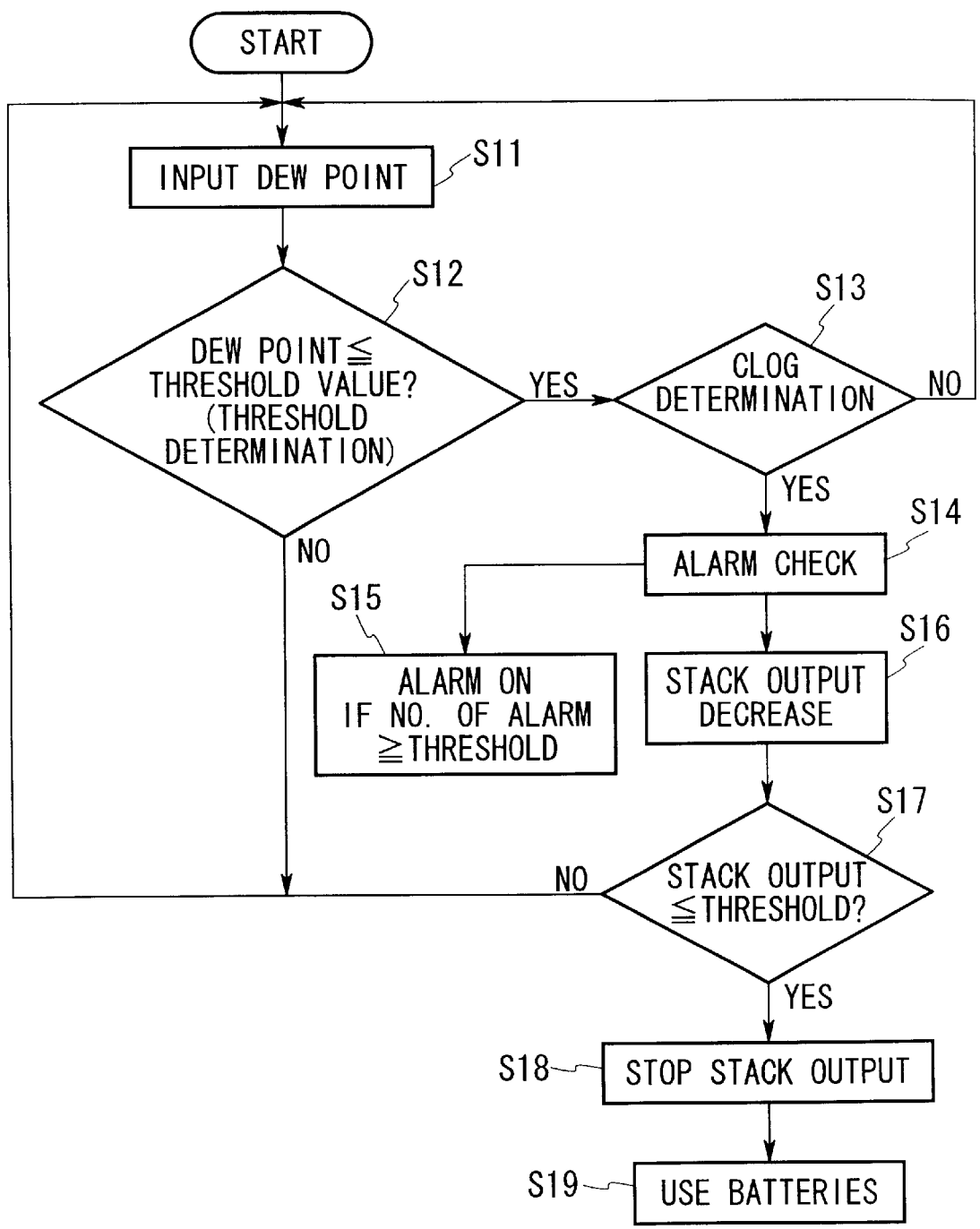
FIG. 6 is a flow chart for explaining a determination control of clogging carried out by the humidification system for a fuel cell according to the second embodiment of the present invention.

In the humidification system 21, as shown in FIG. 6, when the detection signals from the dew point recorders Td 1 and Td 2 are output to the determination unit 22 (in step S11), the determination unit 22 measures, based on the detection signals from the dew point recorders Td 1 and Td 2, the dew point of the supply gas introduced to the stack 3 from the humidification device 1 and that of the discharge gas emitted to the humidification device 1 from the stack 3, and determines if the dew point of the gas is less than a predetermined threshold value (in step S12). If it is less than or equal to the threshold value, the determination unit 22 carries out a clogging determination to determine if clogging is caused in the humidification device 1 (in step S13).

The determination unit 22, if it is determined that clogging is caused in the humidification device 1, carries out an alarm checking (in step S14) and, if the number of alarms exceeds a predetermined threshold value, outputs a signal to the alarm unit 23 so that an alarm is lit by the alarm unit 23 to notify the occurrence of the clogging in the humidification device 1 (in step S15). At that time, the determination unit 22 decreases the output of the stack 3 which is driven by the stack driving device 24 (in step S16).

After that, the determination unit 22 determines if the decreased output of the stack 3 is less than a predetermined threshold value (in step S17). If the output is less than or equal to the predetermined threshold value, the determination unit 22 stops the operation of the stack 3 by the stack driving device 24 to terminate the generation of the output of the stack 3 (in step S18) and outputs a control signal to the drive switching device 25 to switch the driving output to batteries from the stack 3 so that the vehicle may be driven by the electric power generated by the batteries (in step S19).

As explained above, in the humidification system 21, the determination unit 22 measures the dew point of the supply gas introduced to the stack 3 from the humidifier 11 of the humidification system 21 and that of the discharge gas emitted to the humidifier 11 of the humidification device 1 from the stack 3 and, based on the results, the occurrence of clogging in or between the hollow thread members 12 in the humidifier 11 is easily detected. Accordingly, the failure of the stack 3 which can be caused by such clogging may be prevented.

Also, in this embodiment, only one of the dew point recorders Td1 and Td2 may be used and the occurrence of the clogging may be determined based on that detection.

Figure 7:
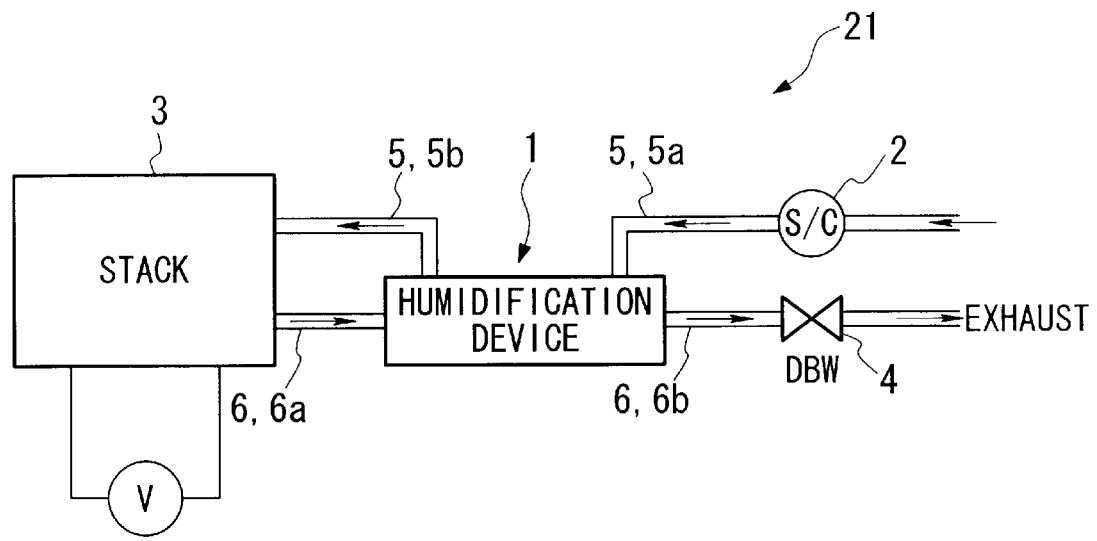
FIG. 7 is a schematic diagram showing a simplified arrangement of a fuel cell for explaining a configuration and a structure of a humidification system for a fuel cell according to a third embodiment of the present invention.
Figure 8:
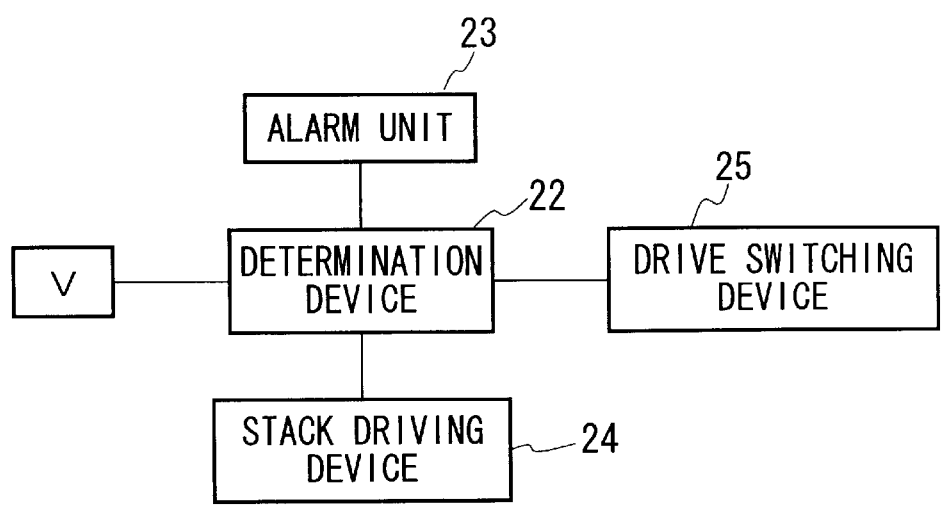
FIG. 8 is a block diagram for explaining a function of the humidification system for a fuel cell according to the third embodiment of the present invention.

FIG. 7 is a diagram showing a third embodiment according to the present invention. In FIG. 7, the humidification system 21 includes a voltmeter V which detects a voltage of each cell of the stack 3. The detection signal from the voltmeter V is output to the determination unit 22 as shown in FIG. 8.

In the humidification device 1, if the clogging is caused in or between the hollow thread members 12 in the humidifier 11, the voltage in cells of the stack 3 is decreased due to the lowering in the humidification capacity thereof for the supply gas.

That is, in the humidification system 21, the decrease in cell voltage in association with the decrease in the humidification capacity of the humifidication device 1 is detected.

Figure 9:
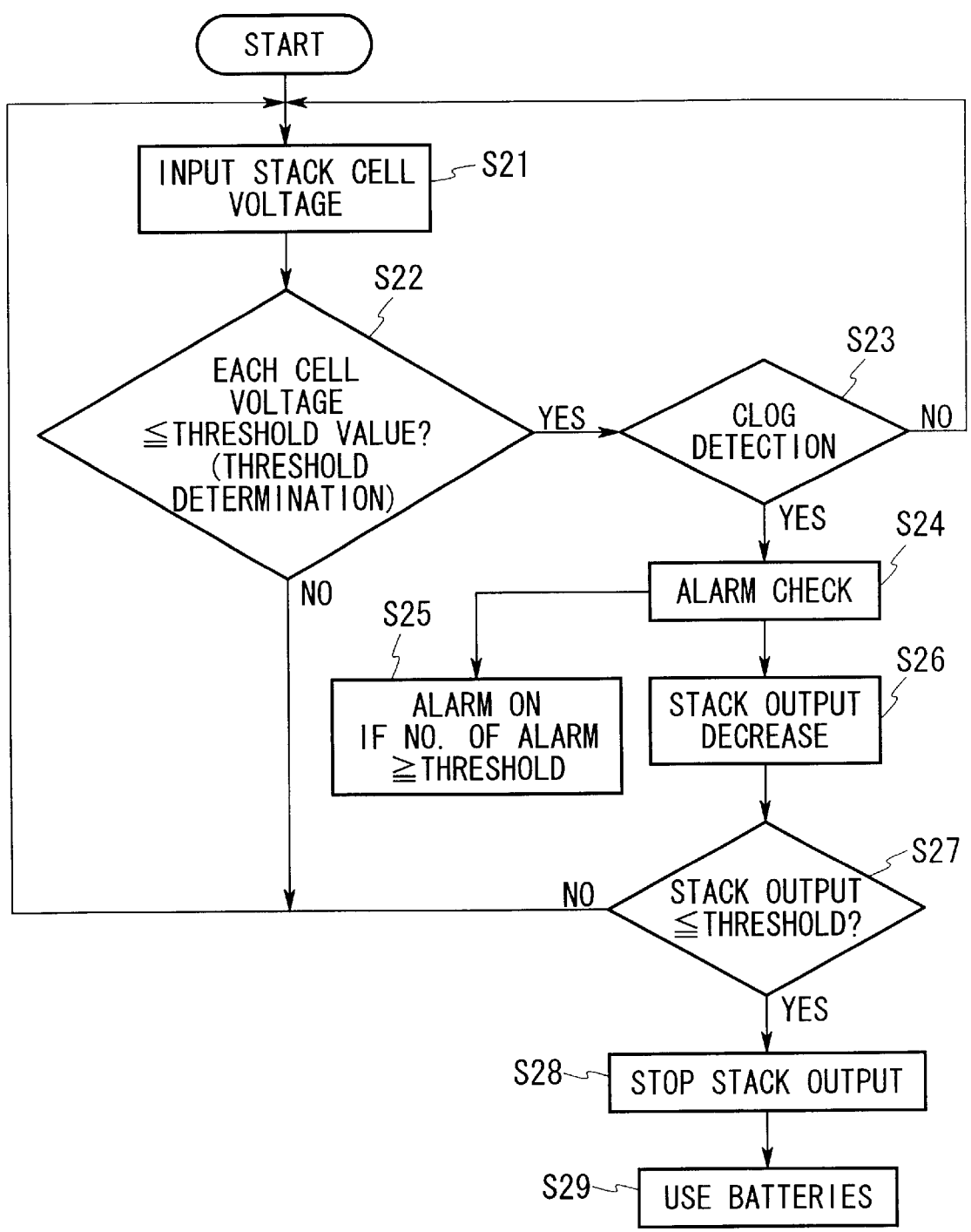
FIG. 9 is a flow chart for explaining a determination control of clogging carried out by the humidification system for a fuel cell according to the third embodiment of the present invention.
Figure 10:
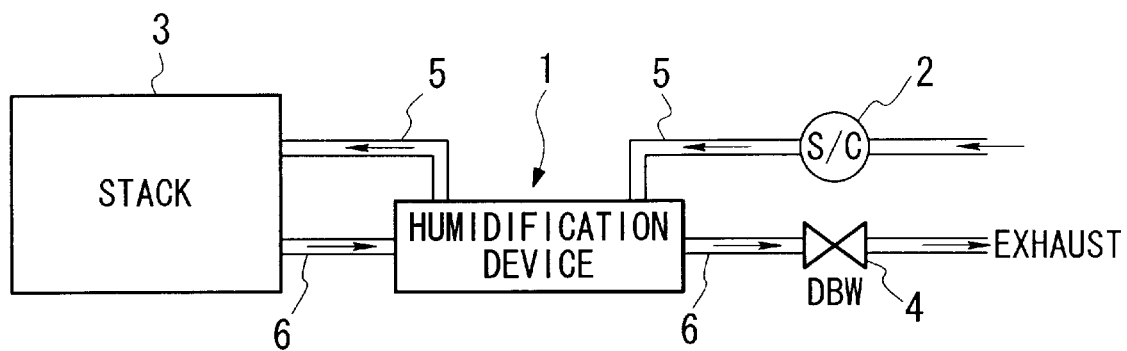
FIG. 10 is a schematic diagram for explaining an arrangement of a fuel cell provided with a humidification device.
Figure 11:
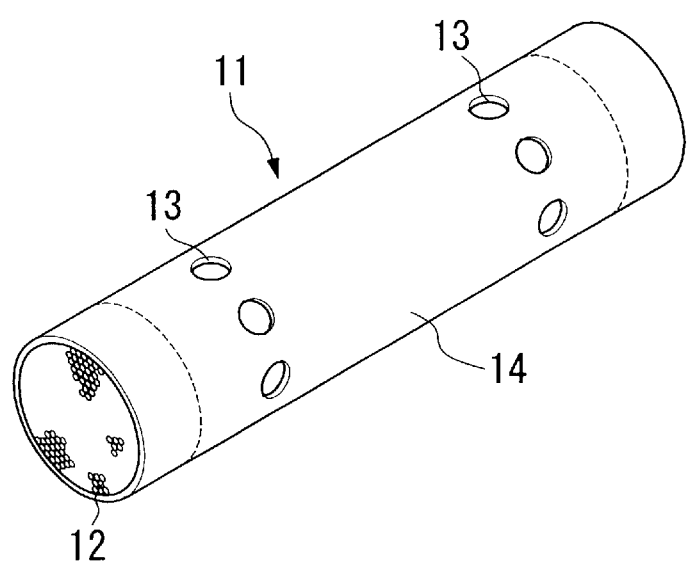
FIG. 11 is a perspective view of a humidifier for explaining a configuration and a structure of the humidifier which forms a part of a humidification device.
Figure 12:
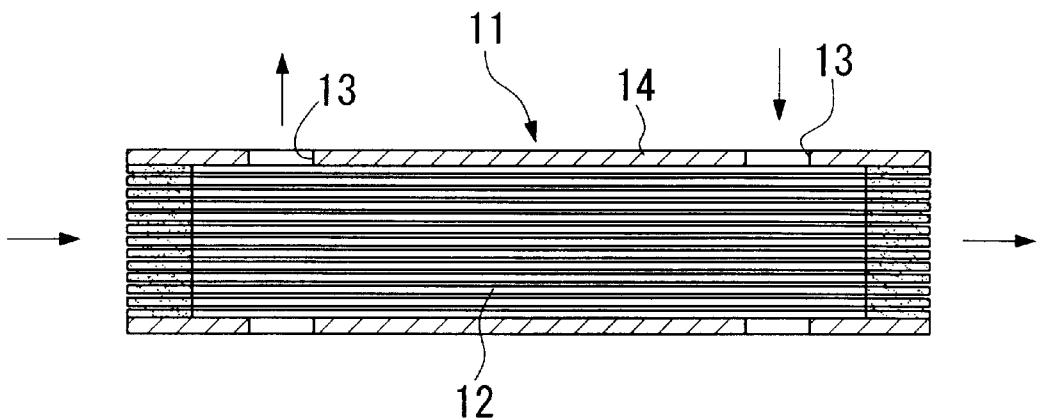
FIG. 12 is a cross-sectional view of a humidifier for explaining a configuration and a structure of the humidifier which forms a part of a humidification device.
Figure 13:
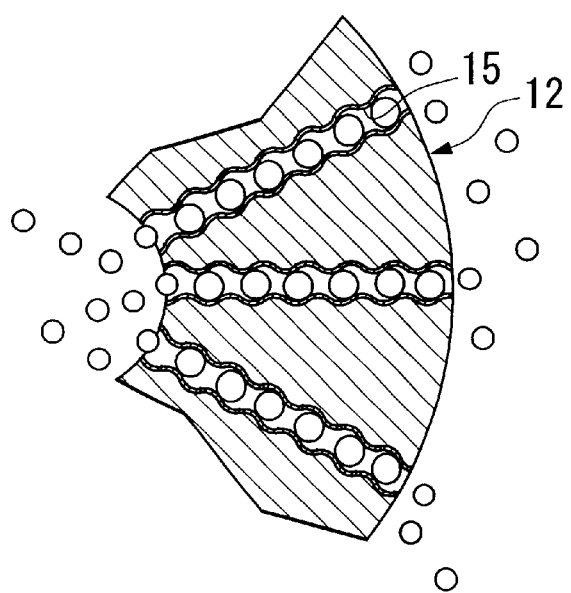
FIG. 13 is a cross-sectional view of a water permeable membrane for explaining the structure of the water permeable membrane which forms a part of the humidifier.

In the humidification system 21, as shown in FIG. 9, when the detection signal of the voltmeter V is output to the determination unit 22 (in step S21), the determination unit 22 measures, based on the detection signal from the voltmeter V, the cell voltage of the stack 3 and determines if the cell voltage is less than a predetermined threshold value (in step S22). If the cell voltage is less than or equal to the threshold value, the determination unit 22 carries out a determination process to determine if clogging is generated in the humidification device 1 (in step S23).

The determination unit 22, if it is determined that clogging is caused in the humidification device 1, carries out an alarm checking (in step S24) and, if the number of alarms exceeds a predetermined threshold value, outputs a signal to the alarm unit 23 so that an alarm is lit by the alarm unit 23 to notify the occurrence of the clogging in the humidification device 1 (in step S25). At that time, the determination unit 22 decreases the output of the stack 3 which is driven by the stack driving device 24 (in step S26).

After that, the determination unit 22 determines if the decreased output of the stack 3 is less than a predetermined threshold value (in step S27). If the output of the stack 3 is equal to or less than the predetermined threshold value, the determination unit 22 stops the operation of the stack 3 by the stack driving device 24 to terminate the generation of the output (in step S28) and outputs a control signal to the drive switching device 25 to switch the driving output to batteries from the stack 3 so that the vehicle may be driven by the electric power generated by the batteries (in step S29).

That is, in the humidification system 21, the determination unit 22 measures the output state of the stack 3 based on the detection signal from the voltmeter V and, based on the results, the occurrence of clogging in or between the hollow thread members 12 in the humidifier 11 of the humidification device 1 is easily detected. Accordingly, the failure of the stack 3 which can be caused by such clogging may be prevented.

Having thus described an exemplary embodiment of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

What is claimed is:

1. A humidification system for a fuel cell, comprising:
   a humidifier including a bundled plurality of tube type hollow thread members made of a water-permeable membrane, said humidifier transferring a water content contained in a discharge gas, which is emitted from a fuel cell, to a supply gas, which is supplied to said fuel cell, when one of said discharge gas and said supply gas is passed through the inside of said tube type hollow thread members and the other one of said discharge gas and said supply gas is passed between said tube type hollow thread members;

a detection device which detects a generation of clogging in or between said tube type hollow thread members; and a stack driving device which controls the drive of a fuel cell stack based on a signal from said detection device.

2. A humidification system for a fuel cell as set forth in claim 1, wherein said stack driving device controls so as to decrease the output from said fuel cell stack or to stop the drive of said fuel cell stack.

3. A humidification system for a fuel cell as set forth in claim 1, wherein said detection device comprises:

a manometer which detects a difference in pressure of at least one of said supply gas and said discharge gas between an upper stream side and a down stream side of said humidifier; and a determination unit which determines a generation of clogging in said humidifier based on a detection signal from said manometer.

4. A humidification system for a fuel cell as set forth in claim 3, wherein said determination unit determines if clogging is generated in or between said tube type hollow thread members by comparing said detection signal with a predetermined threshold value.

5. A humidification system for a fuel cell, comprising:

a humidifier including a bundled plurality of tube type hollow thread members made of a water-permeable membrane, said humidifier transferring a water content contained in a discharge gas, which is emitted from a fuel cell, to a supply gas, which is supplied to said fuel cell, when one of said discharge gas and said supply gas is passed through the inside of said tube type hollow thread members and the other one of said discharge gas and said supply gas is passed between said tube type hollow thread members; and a detection device which detects a generation of clogging in or between said tube type hollow thread members, said detection device comprising:

a dew point recorder which detects a dew point of at least one of said supply gas, which is supplied to said fuel cell, and said discharge gas, which is emitted from said fuel cell and introduced to said humidifier; and a determination unit which determines the generation of clogging in said humidifier based on a detection signal from said dew point recorder.

6. A humidification system for a fuel cell as set forth in claim 5, wherein said determination unit determines if clogging is generated in or between said tube type hollow thread members by comparing said detection signal with a predetermined threshold value.

7. A humidification system for a fuel cell, comprising:

a humidifier including a bundled plurality of tube type hollow thread members made of a water-permeable membrane, said humidifier transferring a water content contained in a discharge gas, which is emitted from a fuel cell, to a supply gas, which is supplied to said fuel cell, when one of said discharge gas and said supply gas is passed through the inside of said tube type hollow thread members and the other one of said discharge gas and said supply gas is passed between said tube type hollow thread members; and a detection device which detects a generation of clogging in or between said tube type hollow thread members, said detection device comprising:

a voltmeter which detects a voltage of said fuel cell; and a determination unit which determines the generation of clogging in said humidifier based on a detection signal from said voltmeter.

8. A humidification system for a fuel cell as set forth in claim 7, wherein said determination unit determines if clogging is generated in or between said tube type hollow thread members by comparing said detection signal with a predetermined threshold value.

* * * * *